Figure 1:
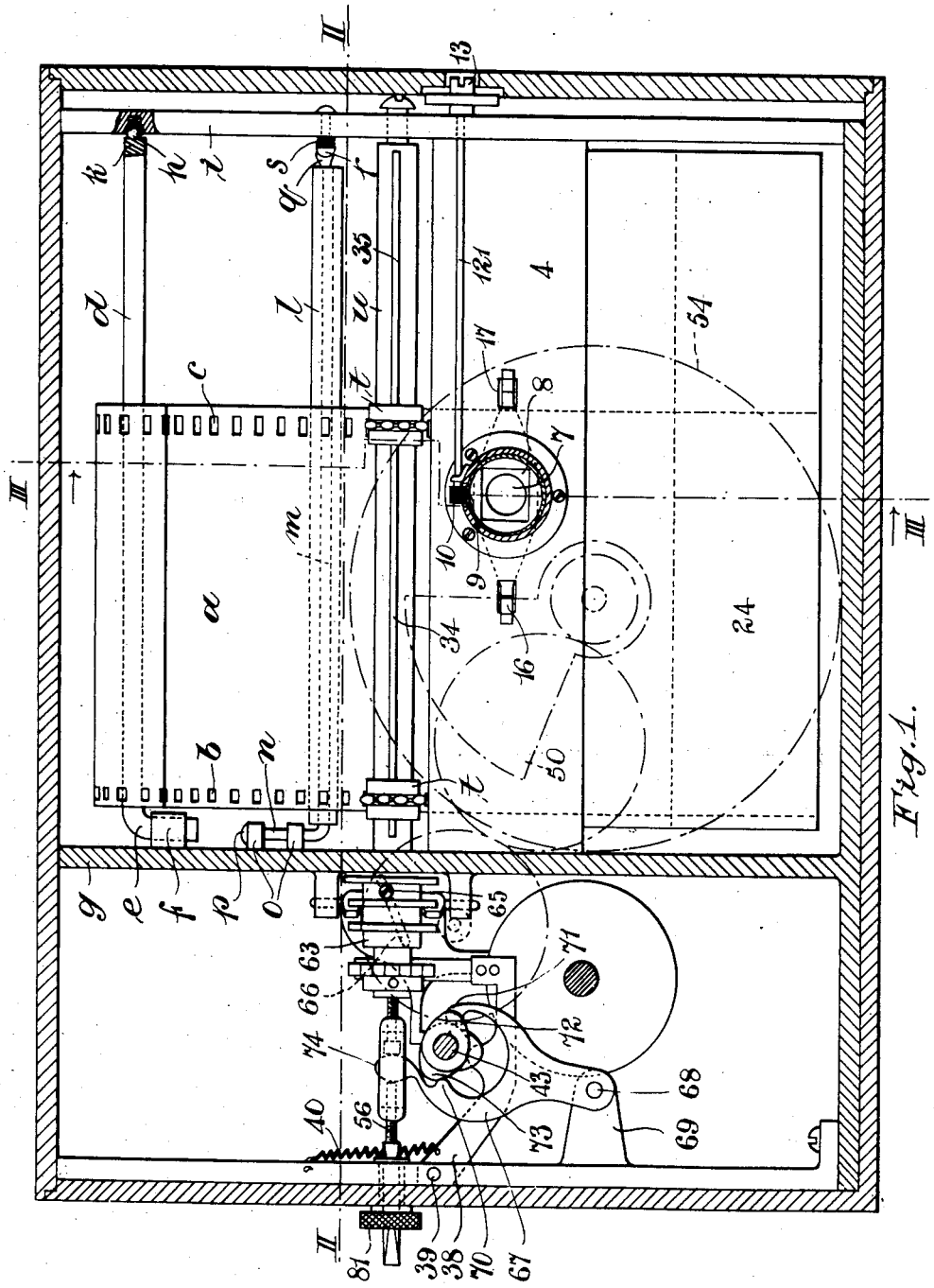

C. DE PROSZYNSKI.
KINEMATOGRAPH CAMERA AND PROJECTING APPARATUS.
APPLICATION FILED MAR. 20, 1913.

1,112,896.

Patented Oct. 6, 1914.
3 SHEETS—SHEET 1.

Witnesses:
F. M. Meyer
Floyd R. Cornwall

Inventor:
C. de Proszynski
per
Attorney.

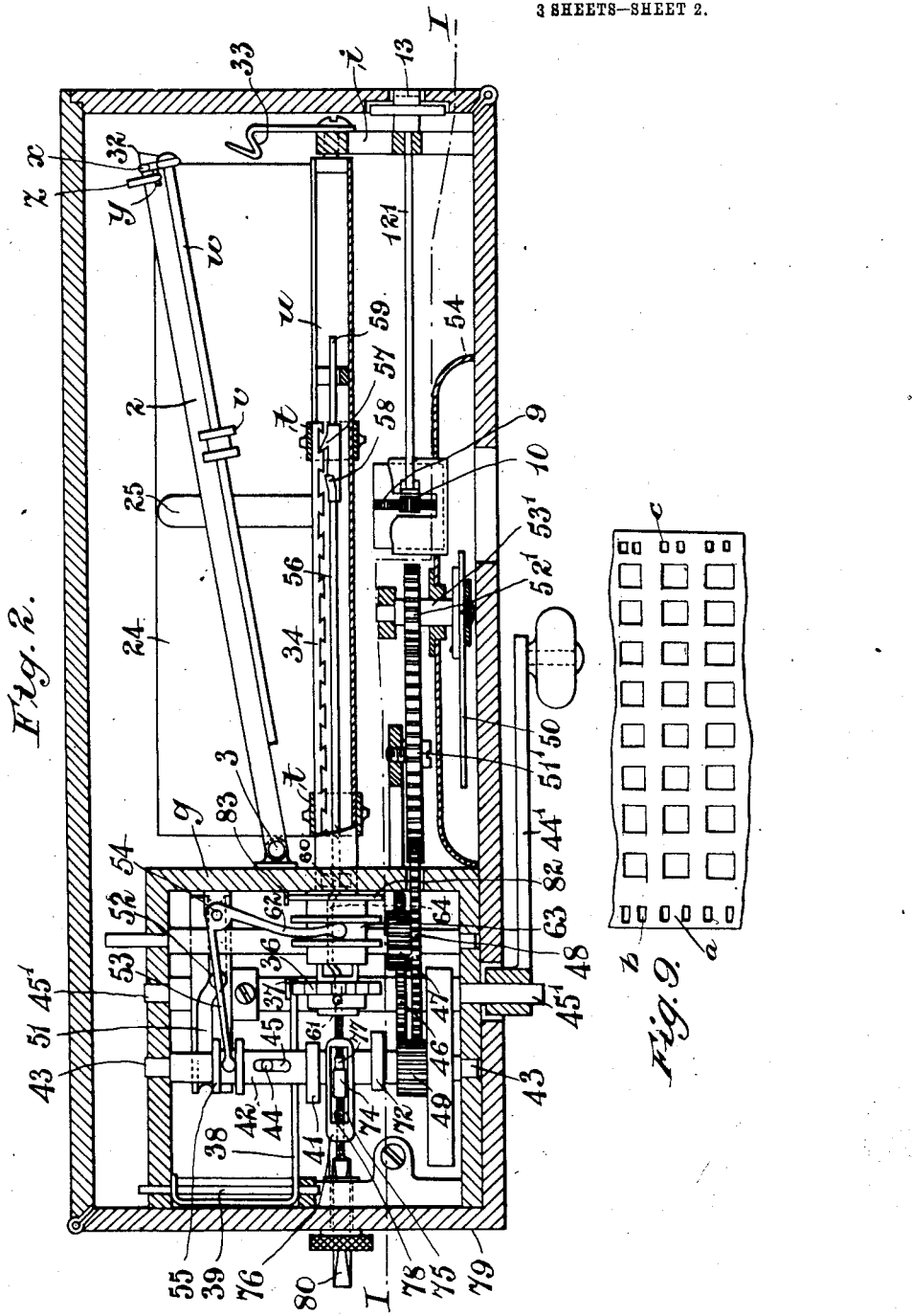

C. DE PROSZYNSKI.
KINEMATOGRAPH CAMERA AND PROJECTING APPARATUS.
APPLICATION FILED MAR. 20, 1913.
1,112,896.
Patented Oct. 6, 1914.
3 SHEETS—SHEET 3.
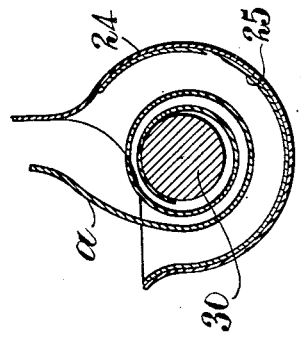
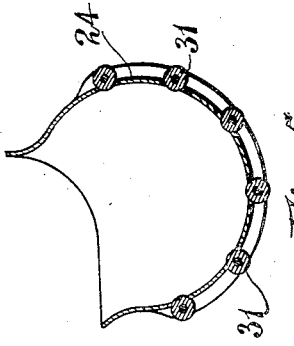
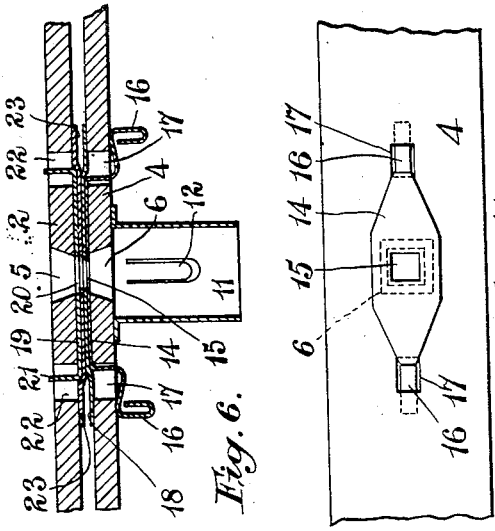
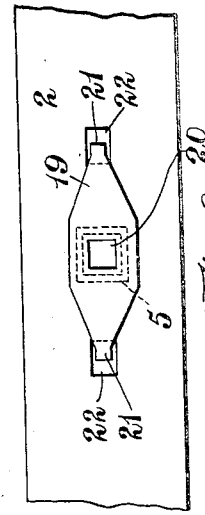
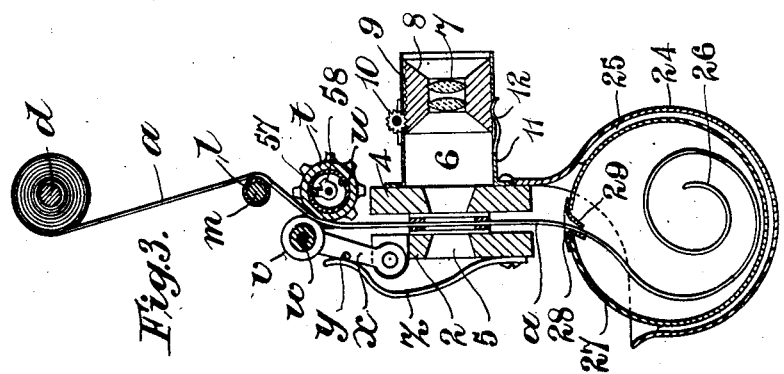
Witnesses:
Inventor:
C. de Proszynski
per
Attorney.

UNITED STATES PATENT OFFICE.

CASIMIR DE PROSZYNSKI, OF LONDON, ENGLAND.

KINEMATOGRAPH CAMERA AND PROJECTING APPARATUS.

1,112,896.      Specification of Letters Patent.      Patented Oct. 6, 1914.

Application filed March 20, 1913. Serial No. 755,693.

*To all whom it may concern:*

Be it known that I, CASIMIR DE PROSZYNSKI, subject of the Emperor of Russia, residing at London, England, have invented certain new and useful Improvements in Kinematograph Cameras and Projecting Apparatus, of which the following is a specification.

This invention relates to kinematograph cameras and projection apparatus of the kind in which a broad film is used, the pictures on the film being arranged in transverse parallel rows, and the film being reciprocated horizontally as well as being intermittently fed forward longitudinally.

The object of the present invention is to provide an improved apparatus of this type which is simplified in construction, efficient in operation and which enables the film to be readily inserted in position and removed after exposure.

In the accompanying drawings:—Figures 1 and 2, are respectively a sectional elevation and a sectional plan of one form of apparatus according to the invention, the sections being taken respectively on the lines I—I, II—II. Fig. 3, is a detail sectional elevation on the line III—III Fig. 1, looking in the direction of the arrows. Figs. 4 and 5, are detail cross sections of modifications in the form of gutter in which the film is collected after exposure. Fig. 6, is a sectional plan showing in detail the adjustable spring plates for the exposure gate. Figs. 7 and 8, are elevations of the spring plates. Fig. 9 shows a portion of film with the pictures arranged in transverse parallel rows.

I will now describe in detail the form of apparatus illustrated in the drawings and will then describe the operation thereof.

$a$, is a broad film having two sets of perforations $b$, and $c$, the perforations $c$, being elongated as known to allow for shrinkage of the film.

$d$, is a supporting spindle on which the roll of film $a$, is slipped, so that it can be freely unwound therefrom. The spindle $d$, is hinged so that it can be swung to one side to facilitate the insertion and removal of the film into and from the apparatus. For this purpose the spindle $d$, has a bent end $e$, extending into a lug $f$, on the partition $g$, which forms part of the frame work of the apparatus. The end $h$ of the spindle $d$, is recessed to receive a spring pressed ball catch $h$, which holds it in its normal or closed position, the spring pressed ball catch $h$, being mounted in the part $i$, of the frame work. From the spindle $d$, the film $a$, is passed over a guide roller $l$, freely mounted on hinged spindle $m$, one end $n$ of which is mounted on lugs $o$, on the partition $g$, and provided with a head $p$, so that the guide roller $l$, can be swung to one side to facilitate the insertion of the film. The end of the spindle $m$, is recessed to receive a round head $r$, of a pin which is impelled toward the end $q$, by a spring $s$. The guide roller $l$, can thus be swung to one side or back again into its normal position and will be automatically engaged and held in that position by the round head $r$. The film $a$, is next passed over sprocket pinions $t$, having teeth brought into engagement with the perforations $b$, and $c$, of the film, the sprocket pinions $t$, being mounted on a tubular shaft $u$, so that they are free to slide axially thereon, but are compelled to rotate therewith as hereinafter explained. Grooved rollers $v$, mounted on a spindle $w$, press the film $a$, lightly onto the pinions $t$ there being one roller $v$ opposite each pinion $t$, although only one is shown in Fig. 2, the other and part of the spindle $w$, being omitted in order that the hinge 3 for the door 2, may be shown clearly. The grooved rollers $v$, are free to rotate and also to slide on the spindle $w$, which is carried by levers $x$, pivoted to a hinged door 2. One of the levers $x$ has a pin $y$, engaged by a spring $z$, which is also mounted on the hinged door 2 and presses the rollers $v$, into engagement with the film. The door 2 is hinged at 3 to the partition $g$, and it forms part of the so called exposure gate, the other part comprising the stationary lens plate 4. The hinged door 2 has an opening 5 opposite to the exposure window 6 in the lens plate 4. The window 6 is in turn opposite to the lens 7 which is conveniently carried in a tube 8, provided with a rack 9 adapted to be engaged by a pinion 10 carried by a fixed tube 11, in which the tube 8 telescopes. The pinion 10 is adapted to be rotated by the spindle 121, by means of a slotted head 13 accessible from outside the casing, so as to enable the lens to be focused. A spring tongue 12 engages with the lens tube 8 and acts as a brake thereon. The hinged door 2 is adapted to be held in its normal or closed position by means of a spring catch 33 which engages the end 32 of the door 2. The lens plate 4 and the hinged door 2 are respectively fitted with spring plates 14 and 19 intended to grip the film between them lightly when the hinged door 2 is in its closed position. The function of the plate 14 is to alter the position of the actual window opening relatively to the lens; the plate 19 presses the film against the plate 14.

In order to protect the film, strips of velvet or other flexible material 18 and 23 are mounted on the lens plate 4 and hinged gate 2 and also on the spring plate 14 and 19. One piece of velvet is fastened to the plate 19 and to the gate 2. The other piece covers the plate 14, but can move freely on the gate 4. The spring plate 14 has spring tongues 16, which pass through slots 17 in the lens plate 4 and bear against the same so as to hold the plate 14 in any position in which it may be adjusted. Similarly the spring plate 19, has tongues 21 which pass through slots 22 in the hinged door 2. The plate 14 has an aperture 15 which is smaller than the apertures 20 and 5 and window 6. By sliding the plate 14 on the lens plate 4 and door 2, the position of the actual exposure opening can be varied slightly and therefore the position of the actual exposure opening in relation to the lens can be carefully set. After the film has passed through the exposure gate it is allowed to freely enter a gutter 24, which may be conveniently mounted upon the lens plate 4, directly below the exposure gate. The gutter is preferably of the curved form shown so that as it receives the loose end of the film $a$, it will allow the same to freely roll up into a coil as indicated at 26, the film rolling up automatically under its elasticity. To protect the film against scratching, the gutter 24 is provided with a velvet strip 25, which will maintain the film out of contact with the gutter 24. If desired, and in order to permit of daylight unloading of an exposed film, a box 27 may be inserted in the gutter 24 the box 27 being provided with a slot 28 arranged directly below the exposure gate so as to receive the film $a$. In order to prevent ingress of light when the apparatus is open, the box may be provided with velvet or flexible strips 29 around the slot 28. The gutter may be round, square or of any other form in cross section.

In a modification as indicated at Fig. 4, a single centrally mounted cylinder or roller 30 may be arranged longitudinally in the gutter, the film $a$, passing between the roller 30, and gutter 24, and wrapping itself around the roller which will act as a guide and tend to assist in the automatic rolling of the film. In a further form as indicated in Fig. 5, the gutter 24, is provided with anti friction rollers 31 to guide the film as it first enters the gutter and to aid it in its winding action. The mechanism so far described only treats with the guiding of the film in its longitudinal movement and its exposure. The pinions $t$, before referred to, are intermittently rotated to effect the desired longitudinal feeding movement of the film $a$, and they are intermittently moved without rotation in an axial direction on the tubular shaft $u$, to effect a step by step lateral movement of the film $a$, in order to expose the film picture by picture at the window 6 the pictures so obtained being arranged in lateral rows.

I will now describe the means by which the intermittent rotation of the pinions $t$, is effected and also the means by which the intermittent axial movement of the pinions is obtained. The pinions $t$, are connected together by a rack 34 which is provided with alternate right and left hand teeth. The rack 34, is a free fit in a slot 35 in a tubular shaft $u$, and prevents the pinions $t$, rotating relatively to the shaft $u$, although they are free to move axially thereon. The tubular shaft $u$, passes through the partition $g$, and is fitted with a toothed wheel 36 which is adapted to be engaged by a spring pawl 37 carried by a lever 38 pivoted on a pin 39. The lever 38 is held in its normal or upper position by means of a spring 40 Fig. 1, but it is intermittently depressed by means of a cam 41, Fig. 2, and when so depressed the spring pawl 37 engages with the teeth of the wheel 36 and thereby imparts the desired rotary movement to the tubular shaft $u$, and the pinions $t$, thereon, in order to effect the required longitudinal feed of the film $a$. The cam 41 is mounted on a sleeve 42, which in turn is mounted on a shaft 43 and caused to rotate therewith by a pin 44 carried by the shaft 43 and entering the slot 45 of the sleeve 42. The shaft 43 is rotated by means of the handle 44', which is mounted on a shaft 45', which drives the shaft 43 through the medium of toothed wheels 46, 47, 48 and 49. The toothed wheel 48 is also utilized to drive the shutter 50, through the medium of wheels 51' and 52' the latter of which is mounted on the spindle 53' of the shutter. The shutter rotates within a protective casing 54. The cam 41 is only adapted to be brought over the lever 38 when it is required to depress the same, namely when the required longitudinal feeding movement of the film is to take place, and this axial movement of the cam 41, is effected by a slotted cam 51, which is mounted on the shaft 45'. The slotted cam 51, receives a pin 52 carried by an arm 53 of a bell crank lever pivoted at 54 the arm 53 engaging with a collar 55 on the sleeve 42. The slotted cam 51 is arranged to move the lever 53 so as to slide the sleeve 42 to bring the cam 41 over the lever 38 when the required rotation of the pinions $t$, is to be effected.

I will now describe the means for imparting the step by step lateral movement to the film. A rod 56 is provided with two pawls 57, 58. The pawls 57, 58 are of opposite hand and are also angularly displaced as will be seen by inspection of Figs. 2 and 3. Only one of the pawls is intended to engage with the rack 34 at a time. When the rack 34, and therefore, the pinions $t$, are to be moved from right to left the pawl 57, engages with the corresponding teeth of the rack 34 whereas when the rack 34 is to be moved from left to right the pawl 58 engages with the corresponding teeth of the rack, the change being effected by a partial rotation of the pawl rod 56, which brings one pawl into engagement with the rack, and the other pawl out of engagement therewith. The end 59, of the pawl rod 56 is free whereas the pawl rod 56 nearer its other end is held in suitable bearings at the position 60, 61 so that when the pawl rod 56 is reciprocated it will slip over the teeth on its return movement, as is common with rack and pawl mechanism. The pawl 57 is shown in the drawings in engagement with the rack 34 the pawl 58 being shown out of engagement therewith, it being assumed that the rack 34 has just completed its lateral step by step movement from the right to the left. The rotation of the pawl rod 56 to change the positions of the pawls 57 and 58 is effected by the forked arm 62, of the bell crank lever, which is pivoted at 54 and the other arm 53, of which, as before described has a pin 52 in operative engagement with the slotted cam 51. The forked arm 62 engages with a collar 63 freely mounted on the tubular shaft $u$. The interior or bore of the collar 63, is provided with a longitudinal slot which receives a cranked part 64, of the pawl rod 56. A pin 65 Fig. 1, passes through the collar 63 and enters a helical slot 66 in a tubular shaft $u$. When the slotted cam 51 moves the arm 53 of the bell crank lever it also moves the arm 62 thereof and the latter causes the collar 63 to slide along the tubular shaft $u$. When this takes place the pin 65 is caused to follow the helical slot in the tubular shaft $u$, so that a slight helical movement is imparted to the collar 63, and the collar through the medium of the cranked part 64 of the rod 56 imparts the required rotary movement to the pawl rod 56 to move the pawls 57, 58 into their new positions. The reciprocation of the pawl rod 56 is effected by means of a lever 67 pivoted at 68 to a stationary bracket 69. The lever 67 is forked to form two abutments 70, 71 which are adapted to be engaged by either of two cams 72 and 73 mounted on the shaft 43. The cams 72 and 73, are angularly displaced by the amount of 180° in relation to one another and they are also displaced longitudinally upon the shaft 43 so that only one at a time can operate upon the lever 67. When either of the cams 72 or 73 is in operative position it fits between the two abutments 70 and 71 of the lever 67, and during each rotation it presses first on one abutment and then on the other abutment so that it moves the lever first in one direction and then back in the reverse direction. One cam is used for reciprocating the pawl rod 56 when the pawl 57 is in engagement, and the other cam is in operative engagement when the other pawl is engaging with the rack. In Fig. 1, the cam 73, is shown engaging with the lever 67. The lever 67 has an upper end 74 which enters the slot 75 in the sleeve 76 mounted upon the pawl rod 56. The end 74 of the lever 67 is adapted to engage with the end 77 of the rod 56, when the lever 67 moves to the right. The end 74 engages with a screw 78 when the lever 67 moves to the left, the screw 78 being screwed into the end of the sleeve 76 so that its relation to the end 74 of the lever 67 can be varied. In order to permit adjustment of the screw 78 from without the casing 79 of the apparatus the screw is provided with a squared extension 80 which is free to slide through a bush having a milled head 81, rotation of which will cause rotation of the screw and, therefore, an adjustment of its end relatively to the end 74 of the lever 67. By this means the clearance between the end of the screw 78 and the end 74 of the lever 67 can be increased or decreased so as to increase or decrease the lost motion between the lever 67, and the pawl rod 56.

Assuming the end 77 of the pawl rod 56 to be adjusted or set once for all relatively to the sleeve 76, then the lever 67 will always move the pawl rod 56 to a determined position to the right, but accordingly as the clearance between the end 77 and the end 74 of the lever is varied, so will the extreme position of the pawl rod 56 to the left be varied and consequently the effective stroke of the pawl rod. This adjustment permits of the regulation which may be necessary, should it be found that owing to slight irregularities between the pawls and rack, the end picture of one row does not register with the first picture of the preceding row.

The shifting of the cams 72 and 73 into and out of engagement with the lever 67 is effected by the sliding of the sleeve 42 through the medium of the slotted cam 51 and lever arm 53. It will be understood that when the cam 41 is over the lever 38 neither of the cams 72, 73 is in operative engagement with the lever 67 and that when either of said cams is in operative engagement with said lever the cam 41 is to one side or the other of the lever 38.

Assuming the parts to be in the position shown in the drawings, except that the hinged gate 2, is in its closed position shown in Fig. 3, and not its open position shown in Fig. 2, the apparatus is put in motion by the rotation of the handle 44'. The first thing to occur will be the movement of the lever arm 53 by the slotted cam 51, and consequently the movement of the lever arm 62, which through the medium of the collar 63 will partly rotate the pawl rod 56 to bring the pawl 57 out of engagement, and pawl 58 into engagement with the rack 34. In this operation the lever arm 62 will slide the collar 63 toward the left, and owing to the pin 65, Fig. 1 working in the helical slot 56 in the tubular shaft $u$, the collar 63 will rotate slightly on the tubular shaft $u$, and through the medium of the cranked part 64, and will impart a rotary movement thereto. The movement of the lever arm 53 will also cause the sleeve 42 to slide on a shaft 43 the arms 53 acting upon the collar 55. This will bring the cam 41 over the lever 38 and as the shaft 43 is rotated, the cam 41 will depress the lever 38 which through the medium of the spring pawl 37 and toothed wheel 36 will rotate the tubular shaft $r$. This rotation will impart the necessary longitudinal feed to the film $a$, so as to bring another lateral strip of film down into the exposure gate ready to receive a lateral row or series of pictures thereon. The continued sliding of the sleeve 42 will eventually move the cam 41 away from the lever 38, and will bring the cam 72 opposite to the lever 67. The continued rotation of the handle 44 will cause the shaft 43 to rotate and the cam 72 will oscillate the lever 67, and therefore, its end 74 will continue to reciprocate the pawl rod 56. The pawl 58, which is in engagement with the rack 34 will during this reciprocation of the rod 56 impart the necessary step by step movement to the rack 34 and therefore, to the pinions $t$, so that the film $a$, will be carried step by step from left to right to expose the fresh lateral strip of film step by step at the window 6. When the pawl 58 has engaged with the last tooth and has carried the rack 34 to its extreme position to the right the slotted cam 51 will again oscillate the lever arms 53, and 62 so that the collar 63 will be moved back again along the tubular shaft $u$, to rotate the pawl rod 56 so as to disengage the pawl 58 and reëngage the pawl 57 with the rack 34. Moreover, the lever arm 53 will slide the sleeve 42 back on the shaft 43 so as to move the cam 72 out of engagement with the lever 67 and move the cam 41 into engagement with the lever 38, which will be depressed to again rotate the pinions $t$, to feed down the film again longitudinally the required means for another lateral strip. The continued movement of the handle 44 will then cause the cam 41 to be disengaged with the lever 38, and the cam 72 to be brought into engagement with the lever 67 so that the rod 56 is once more reciprocated to cause the pawl 57 to work the rack 34 step by step from right to left, and these operations will be repeated until the whole of the film $a$, has been passed through the exposure gate.

It will be understood that the film is gripped with sufficient friction between the rollers $v$, and pinions $t$, and also between the spring plates of the exposure gate to hold it in position and prevent it moving while the pawl is slipping back over the teeth of the rack at any time; moreover, in order to prevent any accidental movement of the pinions $t$, a brake disk 82 is mounted on the tubular shaft $u$, and is adapted to be engaged by a spring 83.

I claim:—

1. In a kinematograph apparatus for use with a broad film and in combination with exposure means, means for feeding said film laterally, means for feeding said film longitudinally, and means for receiving the exposed film comprising a gutter in which said laterally and longitudinally movable film freely coils, substantially as and for the purpose hereinbefore set forth.

2. In a kinematograph apparatus for use with a broad film and in combination with film exposure means, means for feeding said film laterally, means for feeding said film longitudinally, an exposure gate through which said film is moved, and means for receiving the exposed film comprising a gutter located directly below said gate and in which said laterally and longitudinally movable film freely coils.

3. In a kinematograph apparatus for use with a broad film and in combination with film exposure means, means for feeding said film laterally, means for feeding said film longitudinally, an exposure gate through which said film is moved, and means for receiving the exposed film comprising a curved gutter located directly below said gate and in which said laterally and longitudinally movable film freely coils, said curved gutter having a velvet strip on its central interior surface, substantially as and for the purpose hereinbefore set forth.

4. In a kinematograph apparatus for use with a broad film, and in combination with film exposure means, means for feeding said film laterally, means for feeding said film longitudinally, an exposure gate through which said film is moved and means for receiving the exposed film comprising a gutter located directly below said gate and in which said laterally and longitudinally movable film freely coils, said gutter having guiding means within it for aiding the film in its coiling action, substantially as hereinbefore set forth.

5. In a kinematograph apparatus for use with a broad film and in combination with film exposure means, means for feeding said film laterally, means for feeding said film longitudinally, an exposure gate through which said film is moved and means for receiving the exposed film comprising a gutter located directly below said gate and fitted with a central roller about which said film can freely coil.

6. In a kinematograph apparatus for use with a broad perforated film, toothed pinions engaging in the perforations of said film, means for intermittently rotating said pinions, and means for intermittently moving said pinions parallel to their axes, an exposure gate past which said film is moved and a gutter located directly below said gate, substantially as hereinbefore set forth.

7. In combination a broad perforated film, a spindle supporting said film, toothed pinions engaging in the perforations of said film, means for intermittently rotating said pinions to unwind said film from said spindle, means for intermittently moving said pinions parallel to their axes, an exposure gate located below said pinions, and a gutter located below said gate to receive the film and in which it can freely coil, substantially as and for the purpose hereinbefore set forth.

8. In combination in a kinematograph apparatus, a hinged supporting spindle for a roll of broad film, said spindle being longer than the width of the broad film it is intended to support, means for intermittently feeding said film along said spindle laterally with regard to said film, and means for intermittently feeding said film longitudinally with regard to said film, substantially as hereinbefore set forth.

9. In combination in a kinematograph apparatus using a broad film, a hinged supporting spindle for said film, an exposure gate, a guide roller between said spindle and gate, a hinged spindle for said guide roller, means for intermittently moving said film laterally and means for intermittently moving said film longitudinally in said exposure gate, substantially as hereinbefore set forth.

In testimony whereof I have signed my name to this specification in the presence of two subscribing witnesses.

CASIMIR DE PROSZYNSKI.

Witnesses:
H. D. JAMESON,
W. E. ROGERS.